US011458485B2

(12) United States Patent

Fitzsimmons et al.

(10) Patent No.: US 11,458,485 B2

(45) Date of Patent: Oct. 4, 2022

(54) DUST COLLECTOR WITH NEGATIVE PRESSURE BAGGING

(71) Applicant: Oneida Air Systems, Inc., Syracuse, NY (US)

(72) Inventors: John J. Fitzsimmons, Syracuse, NY (US); Jeffrey Hill, Cicero, NY (US); Joseph Baldwin, Syracuse, NY (US); Kyle W. Groening, Syracuse, NY (US); Robert M. Witter, Englewood, FL (US)

(73) Assignee: Oneida Air Systems, Inc., Syracuse, NY (US)

( * ) Notice: Subject to any disclaimer, the term of this patent is extended or adjusted under 35 U.S.C. 154(b) by 142 days.

(21) Appl. No.: 16/918,071

(22) Filed: Jul. 1, 2020

(65) Prior Publication Data

US 2021/0001356 A1 Jan. 7, 2021

Related U.S. Application Data

(60) Provisional application No. 62/870,435, filed on Jul. 3, 2019.

(51) Int. Cl.

*B01D 47/00* (2006.01)

*B04C 5/185* (2006.01)

(Continued)

(52) U.S. Cl.

CPC ............ *B04C 5/185* (2013.01); *A47L 9/1608* (2013.01); *A47L 9/1658* (2013.01); *A47L 9/1683* (2013.01); *B04C 5/15* (2013.01)

(58) Field of Classification Search

CPC ...... B01D 50/20; B01D 50/002; B04C 5/185; B04C 2009/002; B04C 2009/005;

(Continued)

(56) References Cited

U.S. PATENT DOCUMENTS 2,768,707 A * 10/1956 Campbell ................. B04C 5/00 55/455

4,317,716 A * 3/1982 Liller ...................... B03B 9/005 209/484

(Continued)

FOREIGN PATENT DOCUMENTS

EP 1462179 A1 * 9/2004 ............... B04C 9/00

*Primary Examiner* — Dung H Bui

(74) *Attorney, Agent, or Firm* — Bernhard P. Molldrem, Jr.

(57) ABSTRACT

A negative-pressure dust collector system employs a dust separator device to separate the dust that is entrained in a stream of dust-laden air, exhausts the air stream to a vacuum-inducing machine, and discharge the separated dust downward into a bagger arrangement. The latter employs an open-bottom generally rigid hopper with a grid across its open bottom. A flexible dust collection bag is clamped onto an exterior of the hopper and hangs from the hopper. Under vacuum, the bag closes off the open bottom of said hopper. The grid has openings dimensioned so that dust in the container passes freely through the grid when the vacuum-inducing machine is shut off, but so that the bag may be sucked up against the grid, but not sucked into the open-bottom hopper when vacuum is applied. A flexible apron may be attached to the bottom of the hopper between the grid and the dust-collection bag.

10 Claims, 13 Drawing Sheets

(51) Int. Cl.
*B04C 5/15* (2006.01)
*A47L 9/16* (2006.01)

(58) Field of Classification Search
CPC . B04C 5/15; B04C 5/14; A47L 9/1608; A47L 9/1658; A47L 9/1683
See application file for complete search history.

(56) References Cited

U.S. PATENT DOCUMENTS

| | | | | |
|---|---|---|---|---|
| 4,341,352 | A * | 7/1982 | Liller | B03B 9/005 209/3 |
| 4,503,955 | A * | 3/1985 | Fitzsimmons, Jr. | A45C 7/005 190/107 |
| 4,695,299 | A * | 9/1987 | Spadaro | G21F 9/02 96/416 |
| 4,820,315 | A * | 4/1989 | DeMarco | B01D 50/20 95/268 |
| 4,963,172 | A * | 10/1990 | DeMarco | B01D 50/20 55/429 |
| 5,037,370 | A * | 8/1991 | Sundberg | B65H 45/12 493/451 |
| 5,106,488 | A * | 4/1992 | Jonasson | B01D 46/2414 209/17 |
| 5,746,795 | A * | 5/1998 | Witter | B01D 45/16 55/337 |
| 7,247,180 | B1 * | 7/2007 | Hill | A47L 9/0081 55/315 |
| 7,282,074 | B1 * | 10/2007 | Witter | B01D 50/20 55/300 |
| 8,147,580 | B2 * | 4/2012 | Lin | B03C 3/017 55/429 |
| 8,393,050 | B2 | 3/2013 | Witter | |
| 9,017,441 | B1 * | 4/2015 | Vemuri | B01D 45/18 55/432 |
| 9,566,592 | B1 * | 2/2017 | Cheng | B04C 5/185 |
| 9,573,757 | B1 * | 2/2017 | Stravitz | B65F 7/00 |
| 10,265,652 | B1 * | 4/2019 | Cheng | B01D 46/04 |
| D933,321 | S * | 10/2021 | Fitzsimmons | D32/31 |
| 2004/0045124 | A1 * | 3/2004 | Lindquist | A47L 9/149 15/347 |
| 2004/0187449 | A1 * | 9/2004 | Witter | B24B 7/18 55/337 |
| 2005/0132530 | A1 * | 6/2005 | Macleod | A47L 5/28 15/352 |
| 2006/0011756 | A1 * | 1/2006 | Tsai | B23Q 11/0057 241/24.2 |
| 2006/0277714 | A1 * | 12/2006 | Dunning | A47L 9/1608 15/405 |
| 2007/0022564 | A1 * | 2/2007 | Witter | A47L 5/365 15/347 |
| 2007/0298695 | A1 * | 12/2007 | Witter | B24B 7/18 451/350 |
| 2008/0016830 | A1 * | 1/2008 | Witter | B01D 46/521 55/337 |
| 2009/0119870 | A1 * | 5/2009 | Nilsson | B24B 55/06 15/347 |
| 2009/0302041 | A1 * | 12/2009 | Wolfson | B65F 1/062 220/495.07 |
| 2009/0307866 | A1 * | 12/2009 | Witter | A47L 9/1683 15/353 |
| 2010/0037572 | A1 * | 2/2010 | Cheng | B04C 5/185 55/369 |
| 2010/0051493 | A1 * | 3/2010 | Tracy | B65F 1/062 206/395 |
| 2010/0218467 | A1 * | 9/2010 | Witter | B04C 5/04 55/337 |
| 2011/0094052 | A1 * | 4/2011 | Witter | B01D 46/2411 15/347 |
| 2011/0100225 | A1 * | 5/2011 | Lin | B01D 45/18 96/421 |
| 2011/0203238 | A1 * | 8/2011 | Witter | B01D 46/0093 55/356 |
| 2013/0199137 | A1 * | 8/2013 | Hallgren | B01D 46/2411 55/393 |
| 2014/0093301 | A1 * | 4/2014 | Cho | A47L 9/1418 403/24 |
| 2014/0223689 | A1 * | 8/2014 | Witter | A47L 9/1608 15/347 |
| 2014/0223690 | A1 * | 8/2014 | Witter | B01D 46/71 15/353 |
| 2018/0177358 | A1 * | 6/2018 | Conrad | A47L 9/12 |
| 2019/0134649 | A1 * | 5/2019 | Witter | B04C 5/04 |
| 2020/0205925 | A1 * | 7/2020 | Cummings | A61B 50/33 |

* cited by examiner

DUST COLLECTOR WITH NEGATIVE PRESSURE BAGGING

This application claims priority under 35 U.S.C. § 121(e) of Provisional Patent Application Ser. No. 62/870,435, filed Jul. 3, 2019. The disclosure contained therein is incorporated herein by reference.

Dust collectors in general require movement of a stream of air through a separator, e.g., a cyclone, with air pressure driving the air stream to separate the entrained dust from the air. Dust collectors thus require sections operating either under positive (above atmospheric) pressure or negative (sub-atmospheric) pressure. When the fan or blower is in advance of the cyclone, the pressure is positive, and where the fan or blower is after the cyclone, the air pressure is negative. There are advantages to employing a negative pressure system, including that any leakage that affects the dust collection drum or barrel will leak air into the drum, and will not leak dust out of the drum into the ambient. Thus, indoor systems are preferably negative pressure systems.

Single-stage dust collectors have a blower that sucks the dust-laden air from the dust source, i.e., grinder, saw, or other tool, under negative pressure, and then draws the dust-laden air through the blower. After the blower, the air is under positive pressure. In a positive-pressure system, the dust-laden air enters a filter of one sort or another that allows the bulk of the particulates and other such material to fall downward into a bag for disposal. Because the bag is under positive pressure, it inflates. Some operators prefer the convenience of this system because of the easy removal and disposal of the bag. These are typical poly film bags, but can be paper or other plant-based products. The bags should be flexible, and substantially air-impermeable.

In dust collector systems that operate under negative pressure the dust-laden air stream is under vacuum when it passes through the cyclone and dust-bin sections, so that the air reaching the blower is mostly clean. The air after leaving the blower is under positive pressure as it passes through a final filter.

The negative pressure in the dust separation and collection section has traditionally required a rigid dust storage container, e.g., drum, to resist collapse from negative pressure. A bag or liner may be used with these to make dust removal more convenient, but then these require a mechanism such as an air lock, internal bag support, or vent tube to evacuate the air behind the liner. Where an exceptionally long hose connects the dust-producing tool with the intake of the dust collector, more suction is required, and that means the air pressure within the dust collector becomes even more negative.

In a prior arrangement of DeMarco U.S. Pat. No. 4,820,315 a bagger (for asbestos removal) has a flexible poly bag supported on the outside of an open cylinder to collect the separated material. The cyclone and cylinder operate under negative pressure. An elastic band holds the upper part of the bag onto the outside of the cylinder. The unit has a platform that moves up to support the bag material below the cylinder. The bottom of the bag is drawn across the open bottom of the cylinder during operation, and the bag is later pulled down to allow the collected material to fall from the cylinder into the bag. There is no mention of how the poly film of the bag is kept from being sucked up into the cylinder by the negative operating pressure inside the cylinder during operation.

A LongoPac system is described in U.S. Pat. No. 5,037,370 to Sture Sundberg, which employs a long tube of polyfilm folded onto a bag cassette, and this tube is pulled down and tied off with cable ties or the like to form individual collection bags. The Sundberg patent describes the folding method of forming these bag tubes.

The Longopac bag cassette can be used for bagging dust under negative pressure. In such system a storage hopper under the cyclone receives the dust that is separated out in the cyclone. There is a semi-rigid flap valve at the base of the hopper held closed by negative pressure in the cyclone, which closes off the bottom of the hopper section. When the blower is turned off, the pressure equalizes and the flap drops open, allowing the collected dust to flow down into the bag, which may in some cases be a Longopac bag or similar tubular bag. When that bag is filled, the filled section can be closed off using a pair of cable ties, and then the filled section is cut off between the two cable ties. This helps avoid contamination from the dust, as the bag does not have to be lifted out of a drum. These tubular bags are typically a length of successive bags 72 feet long. The semi-flexible flap by itself may leak significant amounts of air, which may compromise the cyclone operation. In actual use, the tubular bag is sucked up against the valve flap, providing effective sealing.

OBJECTS AND SUMMARY OF THE INVENTION

In accordance with an aspect of this invention, a dust collection system employs a cyclonic separator in which an intake hose connects to an inlet tube near the top of the cyclone, and an outlet hose connects to the vortex tube that extends out the top of the cyclone. The base or nose of the cyclone connects to a hopper which can be an open-bottom, generally cylindrical container, to which a poly film bag is attached, e.g. using an elastic strap, a steel band with clamp, or equivalent.

A support grid or equivalent structure covers the open bottom as a means to hold against the poly film of the bag and prevent the polyfilm from being sucked up into the open-bottom container. This can be a grid or grill of rods or fairly rigid wire members. Favorably, a 3-mil plastic bag hangs down from the container and is held in place by a ring clamp, plastic band or elastic strap. In operation, the dust is separated from the air stream by the cyclone, and the dust drops down into the open-bottom container. While the vacuum is present during operation, the plastic film of the bag is pulled up against the grille or gridwork to close off the bottom of the container. When the vacuum is shut off, the bag relaxes and drops down from the bottom of the container, allowing the dust to flow down through the grid into the bag. The spacing or mesh size of the gridwork is open enough so that particles of the collected material do not build up across it and block the flow. When the vacuum is turned on again, the bag is sucked up against the grid, and the sides of the bag just below that seal against themselves to close off the collected material. The dust or other materials in the bag form a more or less rigid mass below the part of the bag that collapses against itself, so the already-collected dust does not pass back up through the grid. This preserves the capacity of the container for additional dust to enter it. When the bag is full, it can be pulled off, or in some cases cut off, and disposed of.

In a typical system, the cyclonic separator may include a cone with or without an upper barrel, and in some cases may be of low-profile Thiele design (see Witter et al., US 2019-0134649)

Some examples of dust collectors with this feature of negative-pressure external bagging can be a wall-mounted vacuum separator with a 5-gallon-size open-bottom container and an associated 30-gallon polyfilm bag. This arrangement can be used on a cart-based vacuum separator with this bagger arrangement in place of rigid dust collection drum or barrel. Also, a more powerful concrete dust collector on a cart can employ this bagger system, with individual polyfilm bags or with a Longo-pac continuous bag system A portable stand can employ a pre-separator for gathering larger chunks or debris, and this can employ the bagger system of the present invention. Such a bagger can be used, for example, for floor refinishing where large amounts of wood dust and grindings are collected.

For some systems, a 5-gallon drum may be used as the open bottom container for direct bagging in place of a much larger rigid barrel, e.g., 50 gallon steel drum.

A tubular bag can be accordion-folded over the container, providing in effect multiple bags. Any of a variety of bags of various sizes can be employed with any given separator or cyclone.

It is possible to use a sealing or semi-sealing flap in place of a grid on the bottom of the drum. Alternatively, a grid may be formed of a rigid plate or platform with multiple holes or openings in it of sufficient size to permit flow of dust into the bag. In that case, a supplemental flexible skirt may also be employed to help prevent the polyfilm bag from being sucked through the holes or openings.

Bracketry may be attached or affixed to the container to allow the arrangement to be mounted onto a wall or onto a shop vacuum cleaner.

Thus, with the arrangement of the present invention, a dust separation and storage section can consist of or employ a rigid intermediate storage hopper with an open bottom, a support grid or equivalent, and a flexible, unsupported non-porous bag under negative pressure. The dust storage section that provides intermediate dust storage can be used with flexible bags of any desired capacity, and the bags are easily closed off and removed for convenient disposal.

While the system is running and vacuum is present, the flexible poly bag is pulled up against the open bottom opening(s) of the hopper, thus sealing the hopper opening(s). This prevents the separation efficiency of the cyclonic separator from being compromised from diminished vacuum. The dust stored in the intermediate hopper is kept in the hopper by the bag being sucked up against the bottom grid while the system is running. When the vacuum is turned off, the internal vacuum disappears, and the pressure inside the bag equalizes. Then the bag drops open and the dust falls into the bag. The dust accumulates after each cycle until the bag reaches its capacity. At that time the bag can be removed (without need of separating the container or hopper from the cyclone) and the filled bag can be easily disposed of.

DESCRIPTION OF PREFERRED EMBODIMENTS

Figure 1:
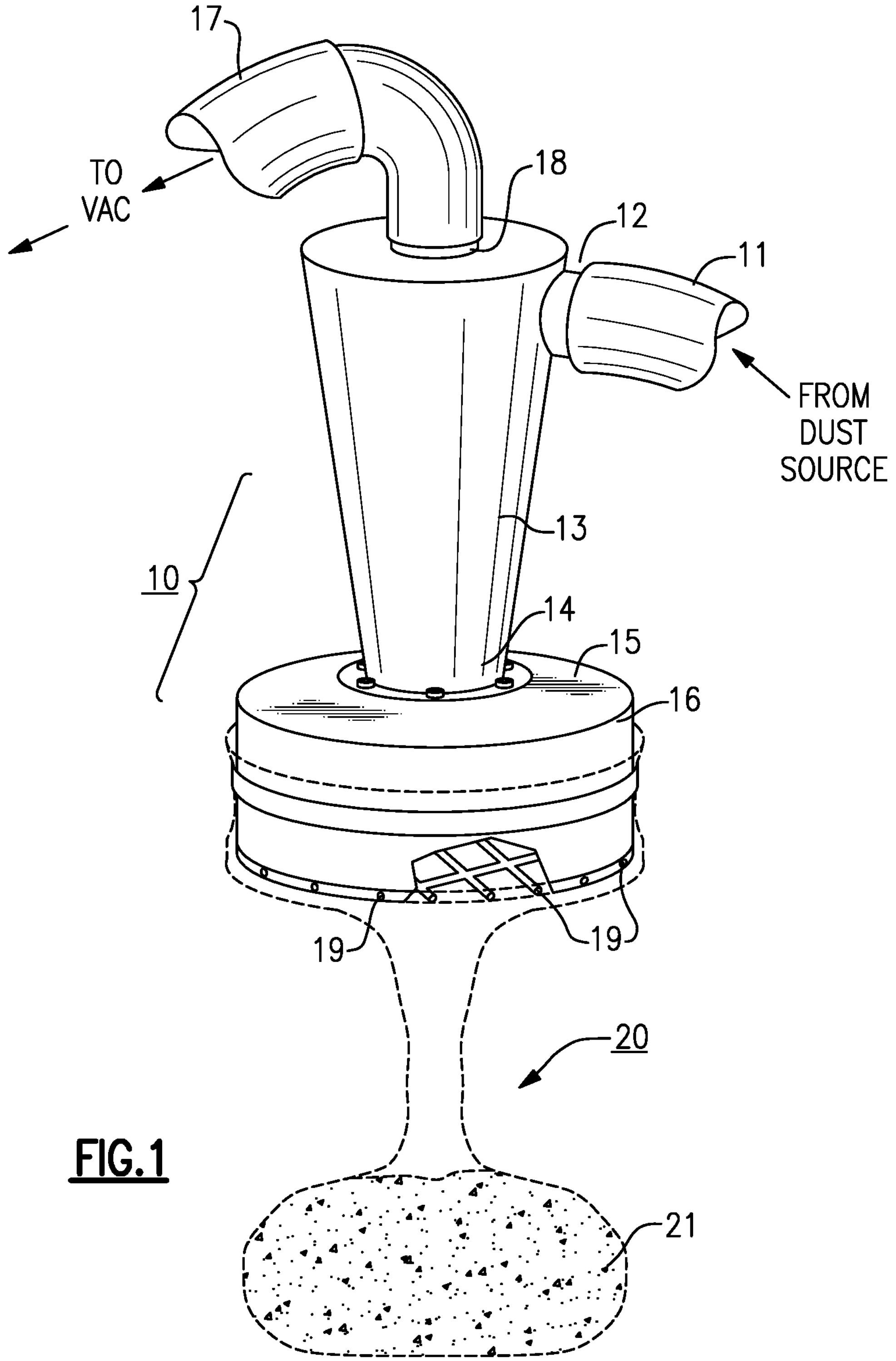
FIGS. 1 and 2 are perspective views of the dust separator and bagger of one preferred embodiment of this invention.
Figure 2:
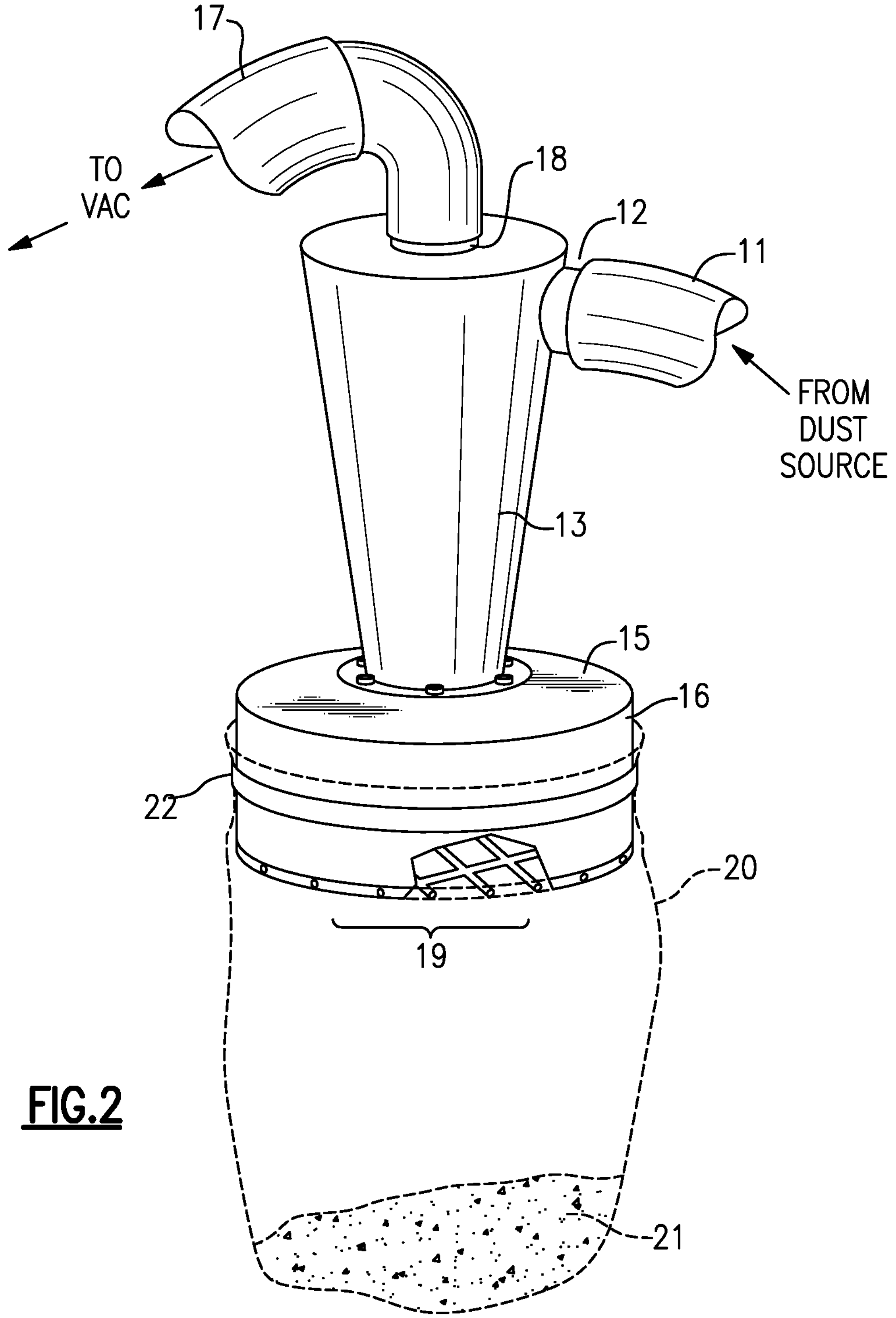

Beginning with FIGS. 1 and 2, a dust separator and bagger of an embodiment of this invention is shown both in operation with vacuum on, and also with the vacuum shut off, respectively. The negative pressure from ambient causes the neck of the bag to collapse, as shown in FIG. 1, so that any collected process dust remains above the bag in the dust bucket or barrel portion. As shown in FIG. 2, with the power turned off to the associated vacuum source, the pressure in the barrel and bag soon equalizes with respect to ambient, so the bag opens fully and the dust in the barrel drops into the bag.

FIGS. 1 and 2 show a dust collection system 10 in which an intake hose 11 that leads from a tool or other source of dust-laden air to an intake tube 12 of a dust separator cyclone 13. The apex or nose 14 of the cyclone 13 is affixed onto a top plate or lid 15 a generally cylindrical open-bottom dust container 16. In some embodiments the lid 15 may include anti-swirl baffle structure or vanes, such as described and illustrated in our provisional patent application Ser. No. 62/964,913, Jan. 20, 2020. An exhaust or outlet hose 17 is attached onto an outlet tube or vortex tube 18 at the top of the cyclone 13. The outlet hose 17 leads to a vacuum machine or dust extractor, which draws air through the system 10. In this system, the air is at a relative vacuum or negative pressure within the cyclone 13 and dust container 16 when the vacuum source is ON.

A grid or grill of spaced bars or wires 19 is present at the open lower end of the container 16, designed with suitable aperture size so that separated dust can pass through when the system is off, but that when the system is on, the associated polyfilm bag 20 will not get sucked up into the container 16. Here, the dust collection bag 20 is formed of a polyfilm of about 3-mil thickness. In some operations, the film could be thicker or thinner. The bag has its top end disposed onto the outside wall of the container 16, and that is secured by a strap or band 22, e.g., an elastic strap. The separated materials, i.e., dust and other debris, are represented as 21, and are contained in the bottom part of the bag 20.

FIG. 1 shows the system 10 in operation with the vacuum source ON. The reduced pressure within the cyclone 13 and container 16 evacuates the air from the bag 20, causing the sides to collapse, as shown, with the separated contents 21 trapped at the bottom of the bag 20. The upper parts of the polybag are drawn against the grillwork or grate or grid 19, closing off the bottom of the container. Any dust entrained in the air passing through the system then lands in the container on top of the grid and bag. When the collection container 16 becomes filled, or at any time that the system is turned off, the shut off of the vacuum causes the air pressure inside the system to return to ambient, and this allows the bag 20 to drop to the open condition of FIG. 2. In some embodiments, a dust-level sensor in the container 16 can operate to cut off the vacuum when a given level has been reached, and automatically turning the vacuum back on after the dust is dropped into the bag. At that time any separated dust inside the container 16 falls through the grid 19 into the bag. Anytime operation is resumed, the bag returns to its collapsed condition as shown in FIG. 1. Eventually, when the bag 20 is filled with material 21 it can be easily removed and replaced, and the bag and contents can be disposed of.

FIGS. 3 to 8 are additional views to explain principles and variations of the dust separator and bagger of the present invention.

Figure 3:
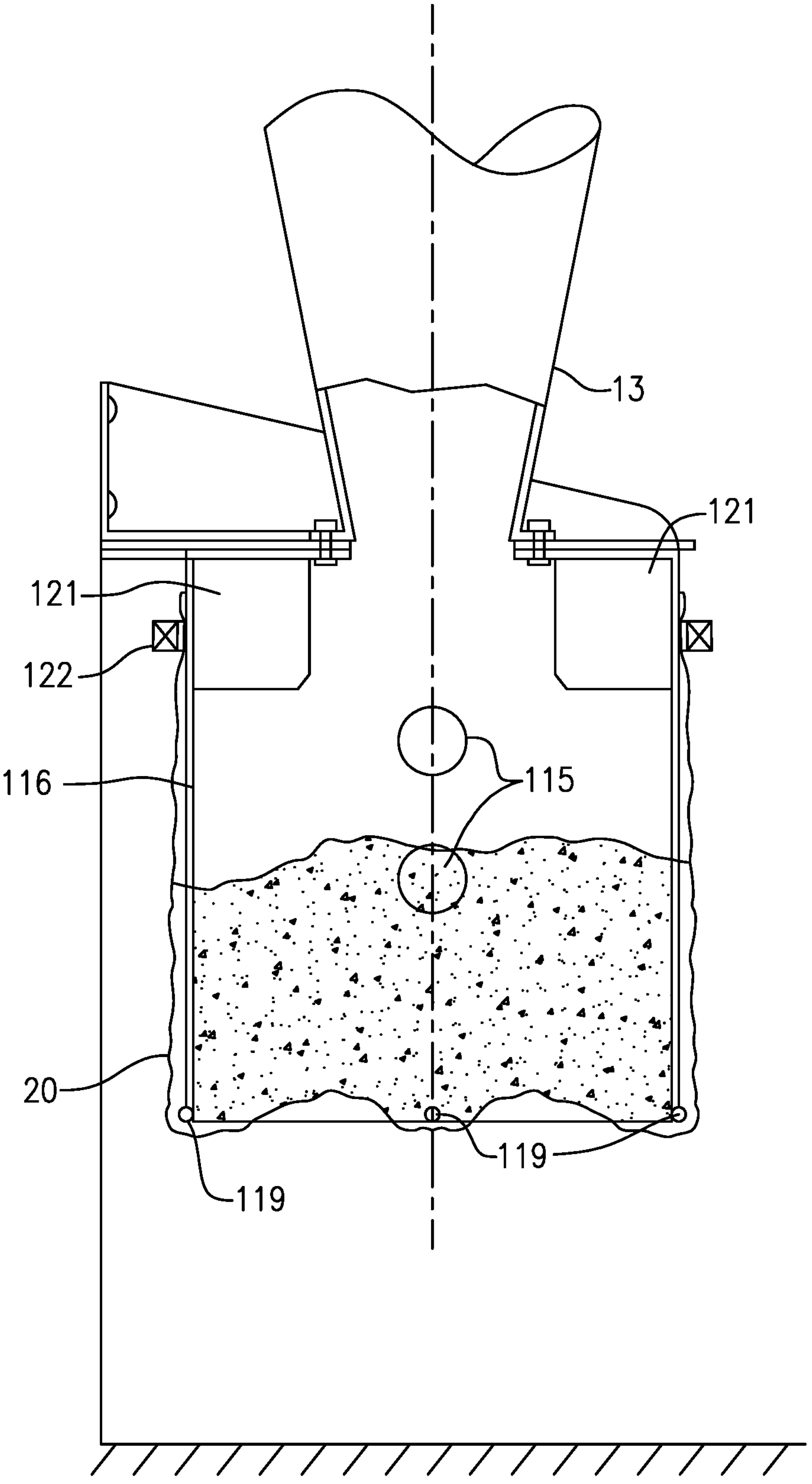
FIGS. 3 to 8 are schematic elevational views of various additional embodiments and variations of the dust separator and bagger of the present invention.

FIG. 3 shows an example in which the grid or grillwork consists of crossbars 119, and in which there are view holes or windows 115 provided in the side of the container to monitor the fill level of the container. An internal support 116, which can be a cylindrical bucket or a skeletal framework, can support the bag 20 and also serve to support crossbars 119 at the open bottom. When the vacuum is on, the bag is pulled up to the crossbars 119, as shown. When the vacuum is off, the bag drops down, and then can be removed and replaced. In this version, there can be vanes 121 near the mouth of the cyclone to help eliminate swirl and turbulence beneath the cyclone to prevent the colleted dust from recirculating from the dust collection bucket or hopper back into the cyclone. A quick release band clamp 122 holds the polybag onto the outside of the bucket or drum, and is configured to provide a good air-tight seal. In some cases there can be two clamp seals, one at the top and one at the bottom of the dust collection barrel or other support cylinder.

Figure 4:
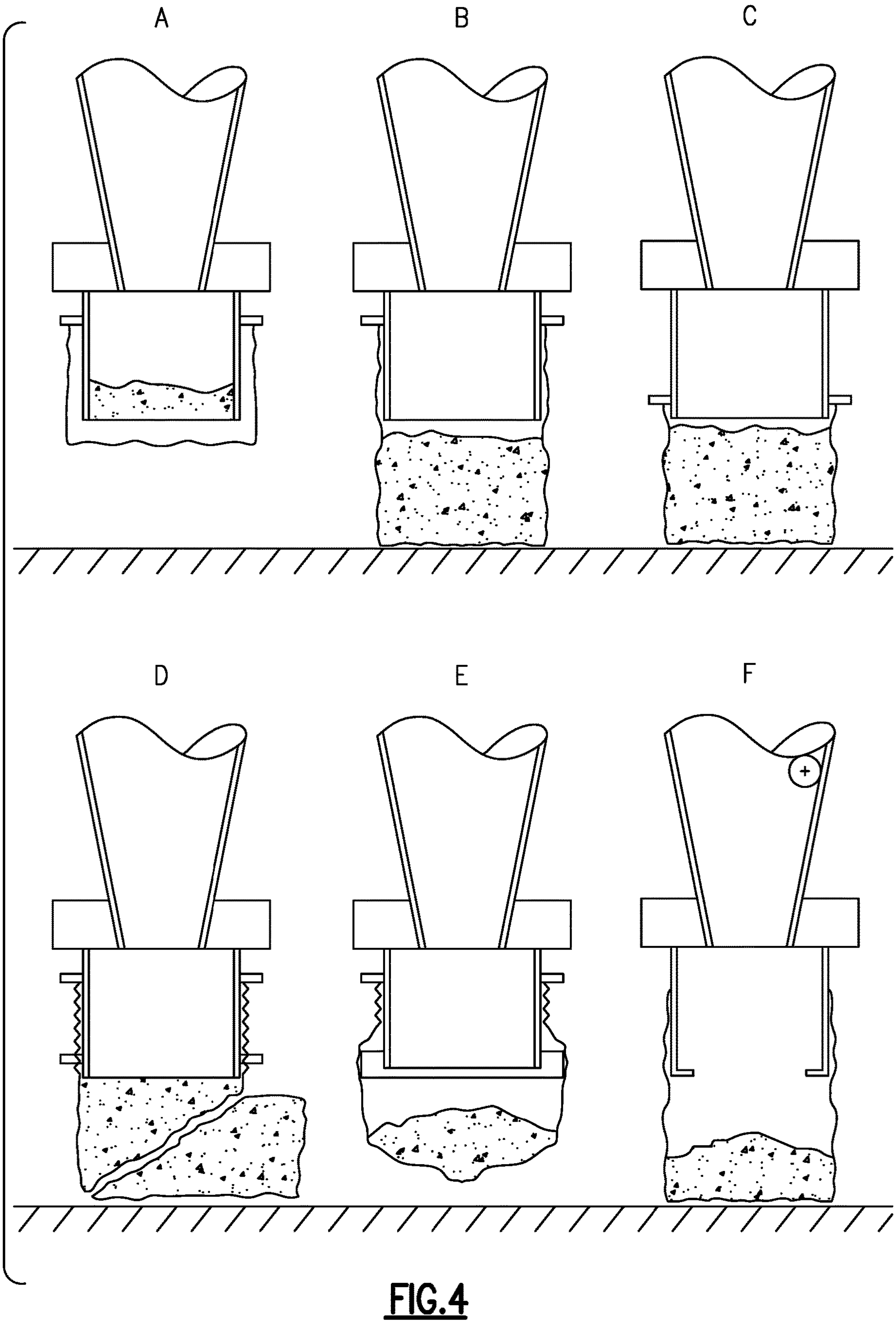

FIG. 4 shows a number of examples (4A to 4F) of cyclonic separators and baggers, where the bag may be clamped in various ways to the cylindrical container. If a single bag is used, it can be secured near the top of the dust collection barrel, or near the bottom. In either case, the associated clamp provides a good seal so air leakage is controlled or blocked. In some cases the bag may be an accordion-folded tube of film, e.g., Longopac or equivalent. That style serves as a series of several bags, which may be pulled down and closed (with cable ties, or the like), as needed. While in some embodiments the bottom end of the barrel can be completely open, it is preferred to have cross bars or an open gridwork to prevent the vacuum from pulling the polybag up into the barrel or into the cyclone. This system can be used with a large commercial cyclone or with a small portable cyclone such as the Dust Deputy® from Oneida Air Systems, Inc.

Figure 5:
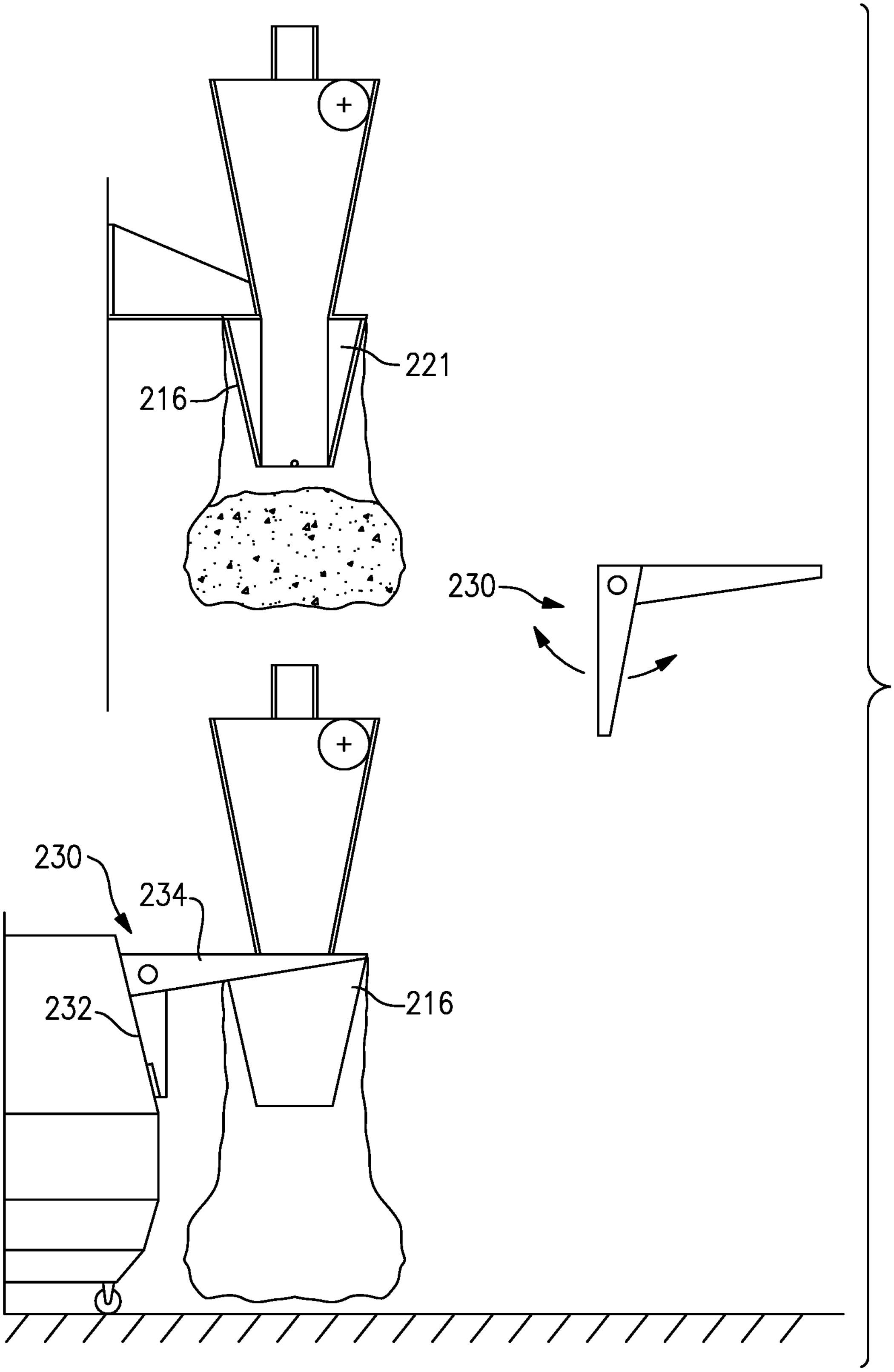

As shown in FIG. 5, a bracket 230 may be incorporated for mounting to a wall or to a vacuum machine, as needed for a given shop. Also, the container 216 may have the form of an inverted conic frustum to facilitate use of the plastic tubular bag, and which may facilitate transfer of the collected materials to the bag when vacuum is shut off. Also shown here are vertical vanes 221 at the top of the cylindrical container (also shown in FIG. 3) which may serve to interrupt any eddies, swirl, or turbulence within the container. The bracket 230 may have its wall portion 232 and container/hopper support arm 234 articulated so as to be adjustable to match the vertical or near vertical support surface.

Figure 6:
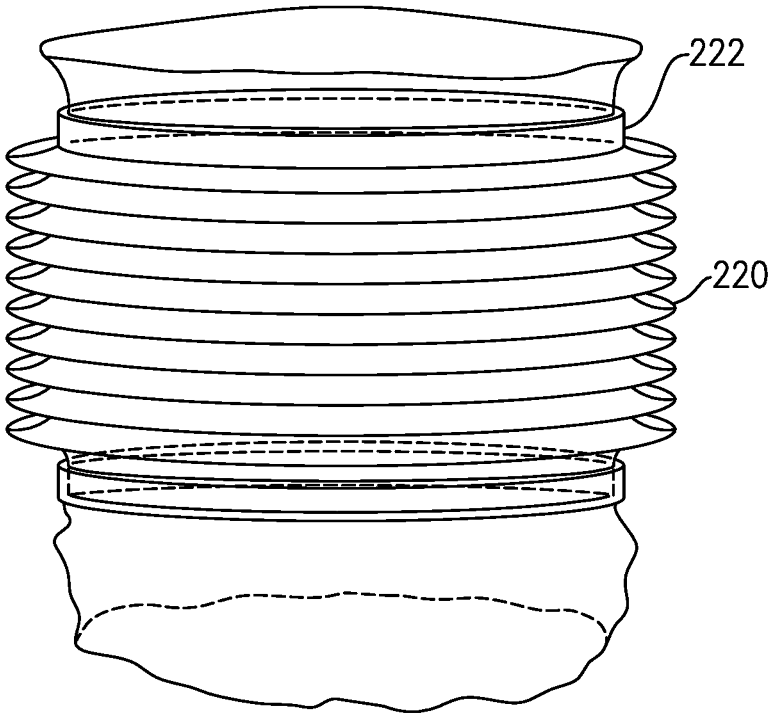

The possible arrangement of a cassette with a multiple of bags, in the form of an accordion-folded polyfilm tube 220, is shown in FIG. 6. The plastic film may be of 4-mil thickness. The polyfilm tube may be pleated for mounting the entire length of bag tube onto the side of the container or dust hopper. Here, the pleated polyfilm bag tube 220 is fitted onto a hollow cylindrical fiber core 222 that in turn fits onto the outside of the dust collection container or hopper. Elastic bands 224 are shown here securing the bag tube 220 to top and bottom ends of the core 222.

Figure 7:
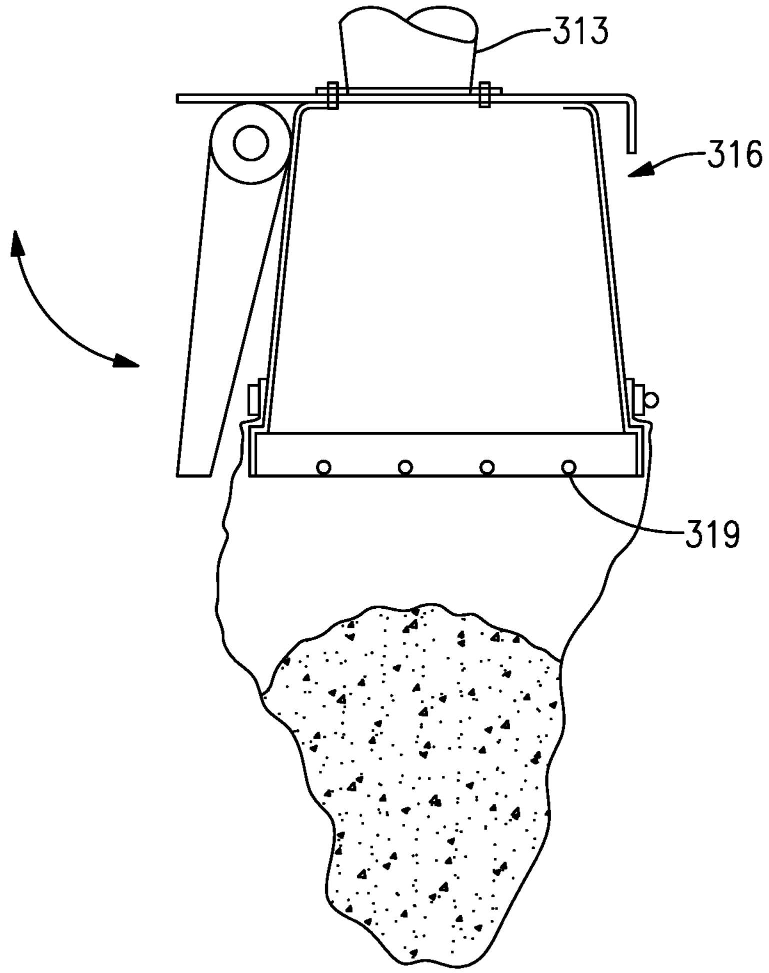

FIG. 7 shows an example in which the dust container 316 is in the form of an inverted five-gallon bucket, with a grate 319 at the wide, open lower end, and with the narrower upper end being attached onto a top plate that has an associated mounting bracket, and on top of which a plastic conic cyclone 313 is also mounted. The polybag 320 is shown clamped onto a rim at the wide and open lower end of the container 316, using a band clamp.

Figure 8:
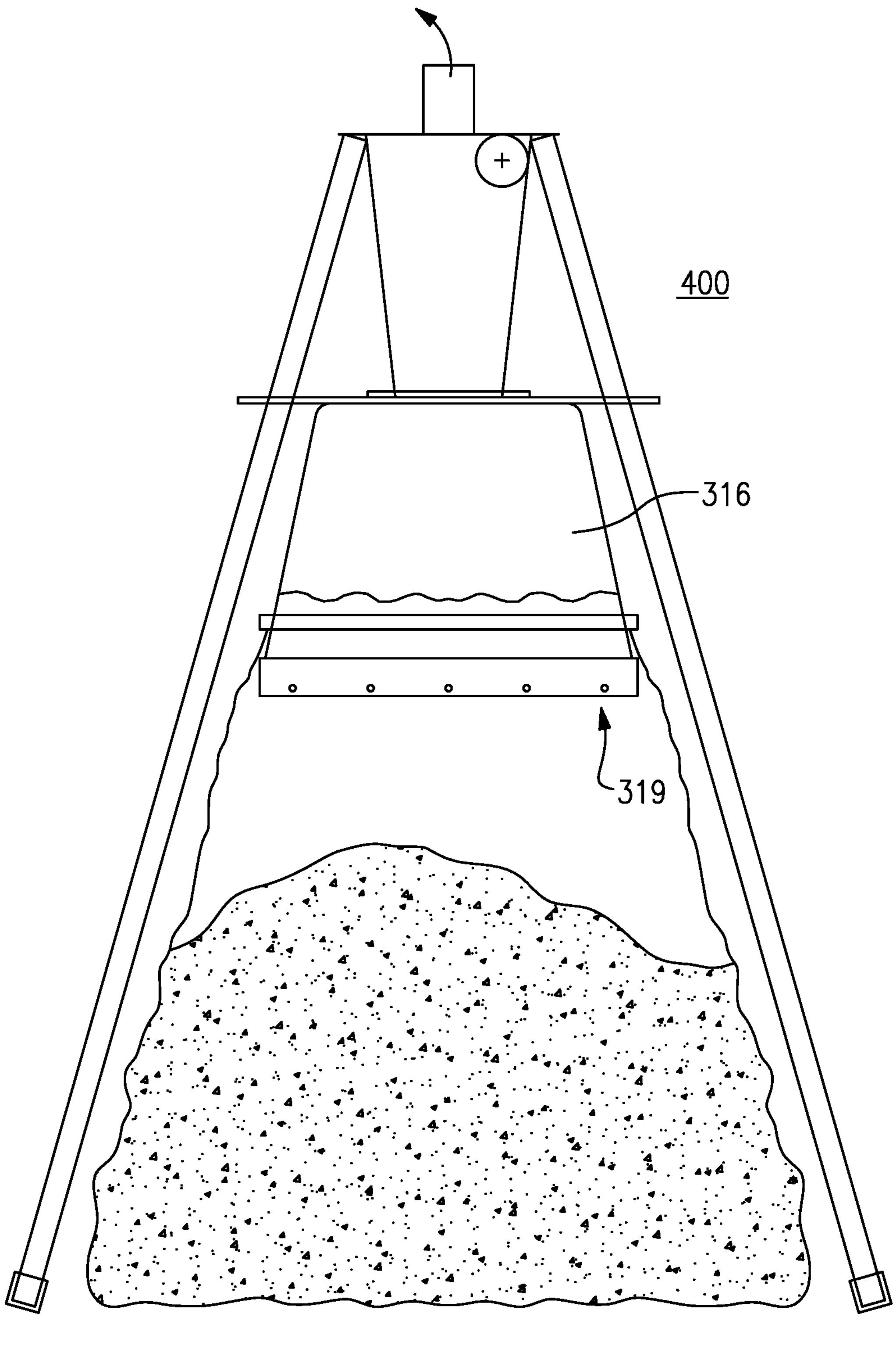

FIG. 8 shows a dust separator system on a tripod mount 400 providing a large space beneath the open end of the container 316 so that an extra large polybag can be attached onto the lower rim of the bucket container 316. The legs of the tripod can be adjusted to be longer or shorter, as needed. Note here, the grid 319 can be easily removed for clearing out "birds nests" of the collected dust, debris, and other items sucked into the machine.

Figure 9:
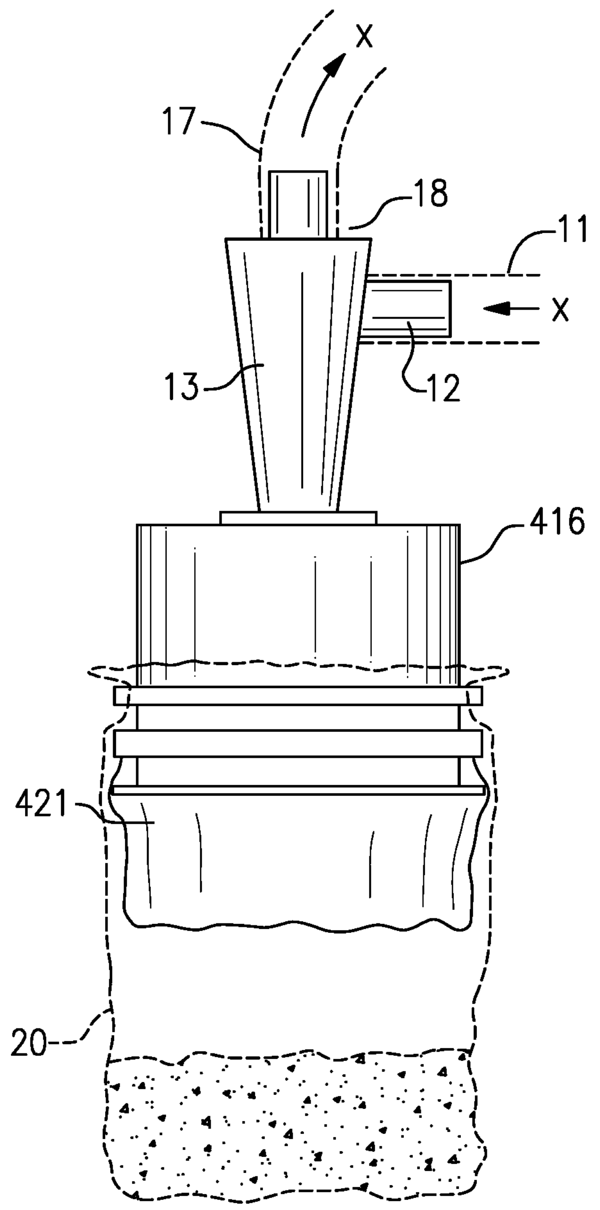
FIGS. 9 and 10 are elevational views of another embodiment in which a flexible skirt is employed between the dust collection container and an associated flexible film dust collection bag.
Figure 10:
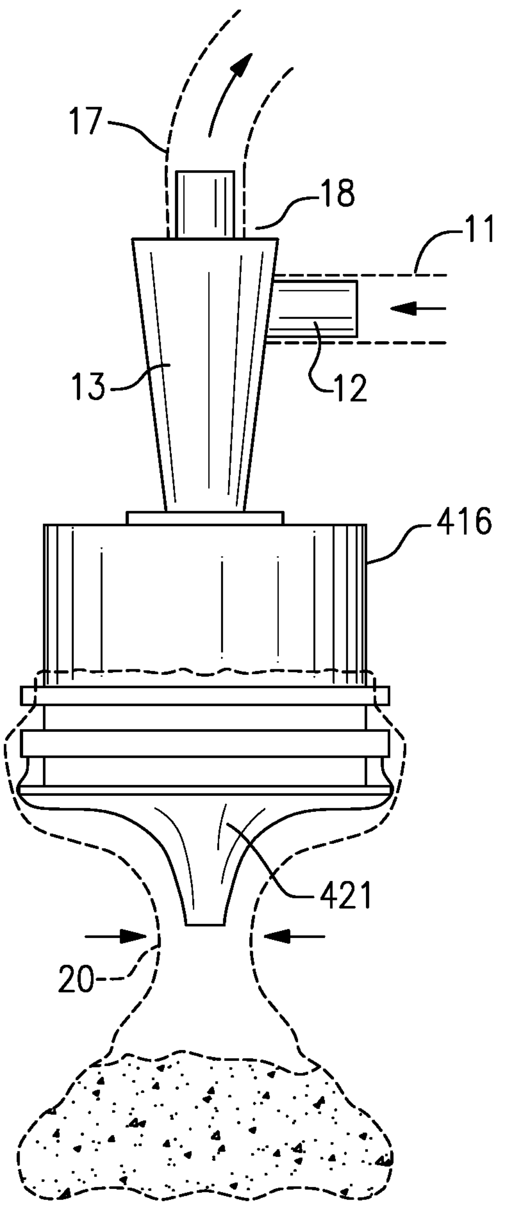
Figure 9A:
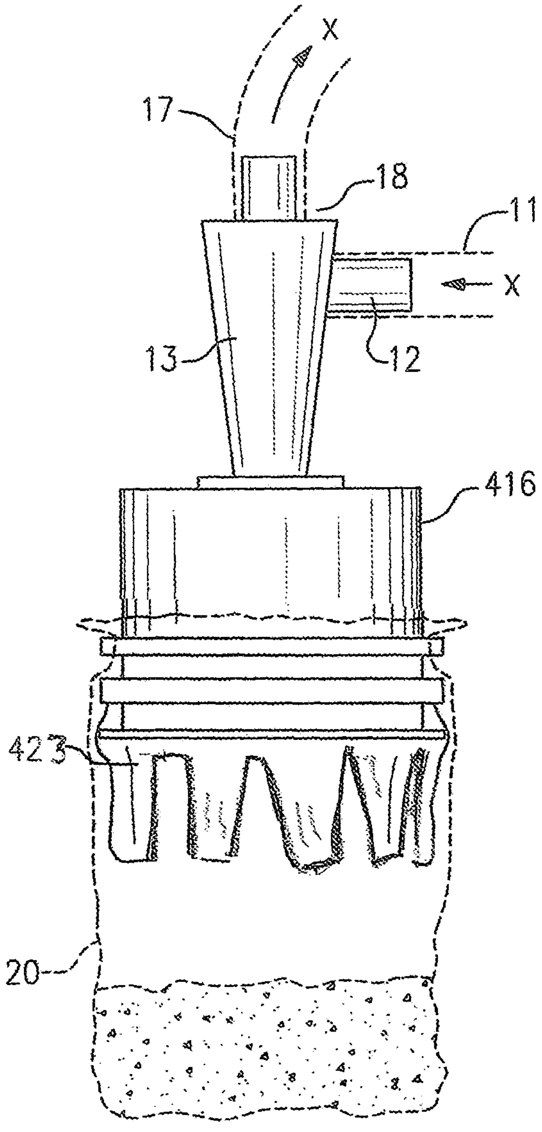
FIG. 9A illustrates a variation on the embodiment of FIGS. 9 and 10 in which the flexible skirt is in the form of a series of flaps.

FIGS. 9 and 10 illustrate an embodiment of this invention which includes a flexible apron member 421 is attached by a band clamp near the lower rim of a molded open-bottom dust collection barrel 416, where the latter has grid work or cross-bars as mentioned previously. Here, a cyclonic separator is mounted onto an upper lid of the collection barrel 416, and is shown with a cone body 13, an inlet hose 11 leading from a dust-producing tool to an inlet port 12, an outlet hose 17 leading from an outlet port, i.e, the unit's vortex tube 18, to a not-shown vacuum source. The "X" on the inlet and outlet in FIG. 9 indicate the air flow is OFF, while the vacuum source is providing the air flow in FIG. 10. The apron 241 is fitted beneath the polyfilm bag 20. In this embodiment the bag can be made of a 3-mil film, or thinner film in some cases. The apron 421 is formed of a slightly heavier flexible material and can be configured as a single piece arranged in a cylinder surrounding the lower end of the container or bucket 416, or may be formed of a series of flexible flaps (see flaps 423, FIG. 9A) distributed around the lower open end of the container 416. The purpose of the apron 421 is to close against the open areas on the base or lower end of the container 416 (see FIG. 10) and prevent the film of the polyfilm bag 20 from being sucked into the container 416. Note that when the vacuum source is turned on, the apron 421 is lifted to the bottom end of the container, so that the polyfilm bag 20 does not get sucked into the system. However, the upper part of the bag forms a neck that closes over the collected dust. The neck opens up when the vacuum source is OFF and the apron 421 drops, as shown in FIG. 9, so that the collected dust can fall into the bottom of the bag.

Figure 11:
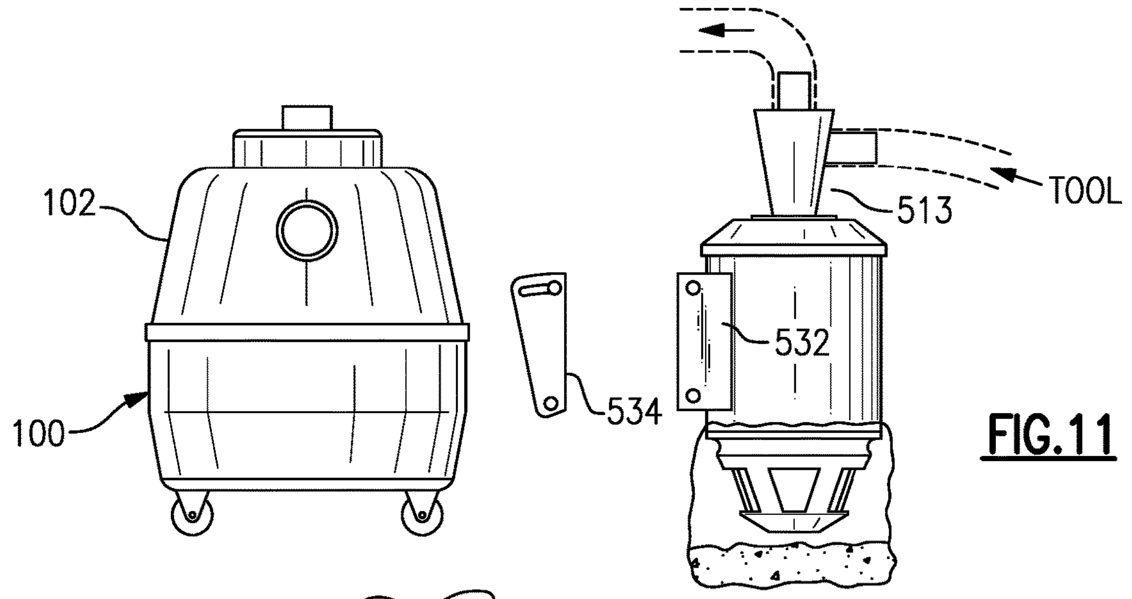
FIGS. 11 and 12 illustrate an additional embodiment that includes an adjustable angle mount for mounting the unit on a vertical or nearly vertical surface such as the body of a shop vacuum cleaner or dust extractor.
Figure 12:
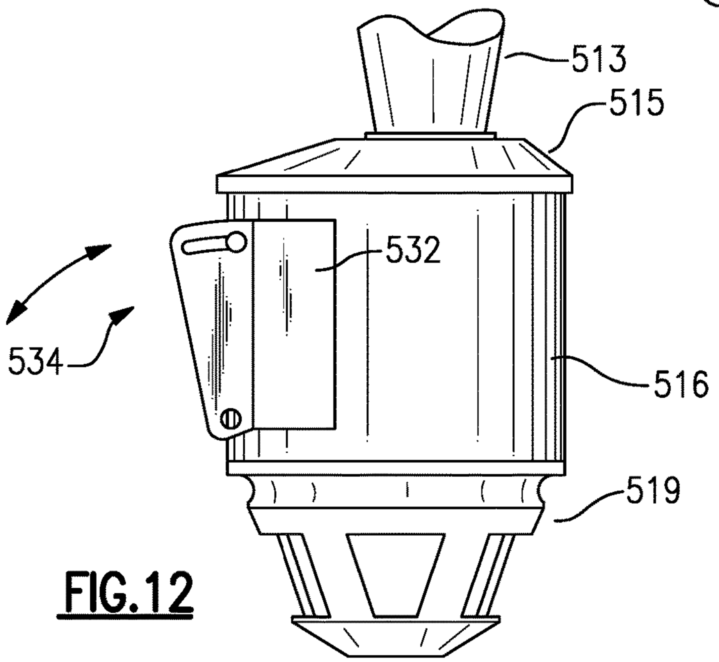
Figure 14:
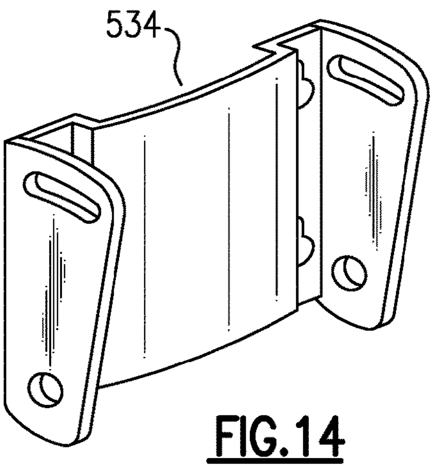
FIGS. 13A, 13B, 14 and 15 are additional views illustrating the mounting plate associated with this embodiment.
Figure 13A:
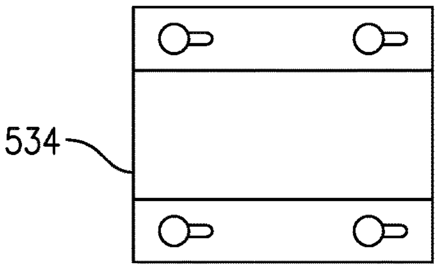
Figure 13B:
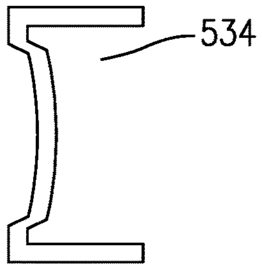
Figure 15:
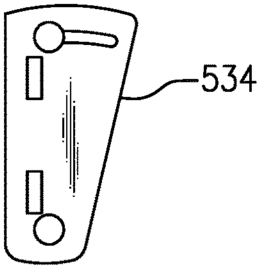

FIGS. 11 and 12 show the unit adapted for mounting on the side of the body of a shop vacuum cleaner 100, whose upper housing 102 is of a frustoconic shape. Here the molded body of the dust collection barrel 516 has a generally cylindrical side wall, with a lid 515 on which the cyclone 513 is mounted and a lower end 519 which may have crossbars or a grid with openings. The polyfilm bag 20 plus an apron if needed can be mounted onto an annular channel formed just above the lower end 519. Here, a mounting plate 532 is adapted to attach onto the outer surface of the barrel 516, and there is a mating adapter plate 534, shown in FIGS. 13A, 13B, 14 and 15, for mounting onto the frustoconic upper part 102 of the shop vacuum cleaner 100. Here the adapter plate 534 has side flange with a curved slot for angular adjustment, and a web portion that is curved to form a relieve for the curvature of the shop vacuum body. The adapter plate can be inverted if need be to match either negative or positive surface slope. This mounting bracket may also be used to mount the dust collection system to a permanent vertical or somewhat vertical surface, such as a wall.

Figure 17:
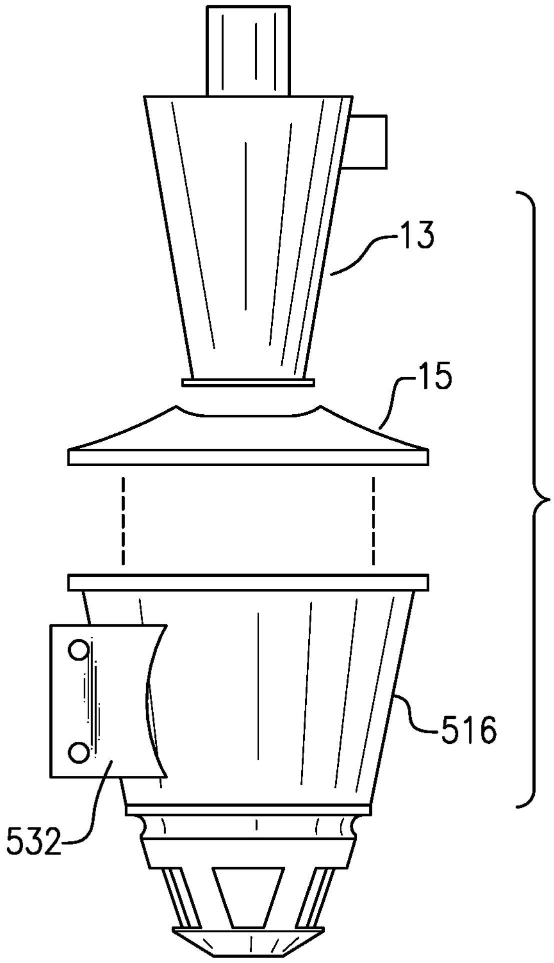
FIGS. 16, 17 and 18 are a back view, side view and bottom view of an injection molded bagger body of another embodiment of this invention.
Figure 16:
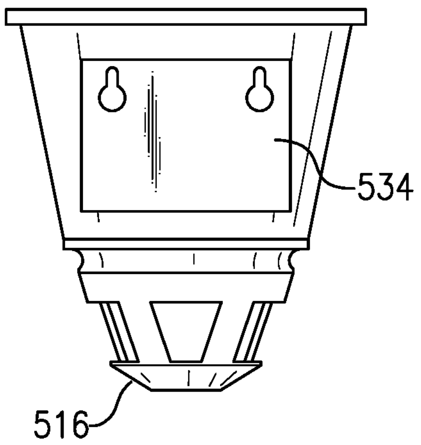
Figure 18:
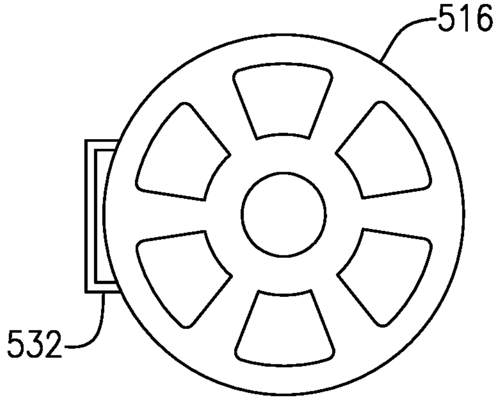
Figure 19:
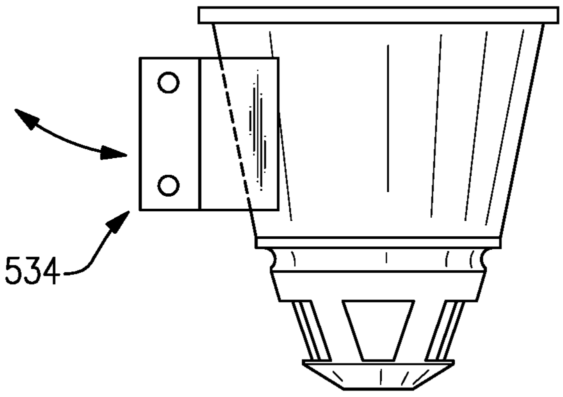
FIG. 19 is a schematic view showing the incorporation of an adjustable-angle wall-mount bracket.

This same embodiment as an injection-molded bagger of a durable rigid plastic resin is shown in FIGS. 16 to 19, where the dust collection barrel 516 and the associated wall mounting plate 532 and adapter plate 534 as shown in a back view (FIG. 16) side exploded view (FIG. 17), and top plan view (FIG. 18). This may be mounted onto a vertical wall or with the adjustable angle bracket 534 to the side of a shop vacuum cleaner or other equipment. The design for the injection molded embodiment allows the unit to be manufactured at relatively low cost from a good technical plastic resin to achieve superior performance. The resin may have some electrical conductance so as to dissipate any static charge build-up. As shown in FIG. 17, a lid 15 and cone 13 can be fitted easily onto an open top of the barrel 516.

Figure 20:
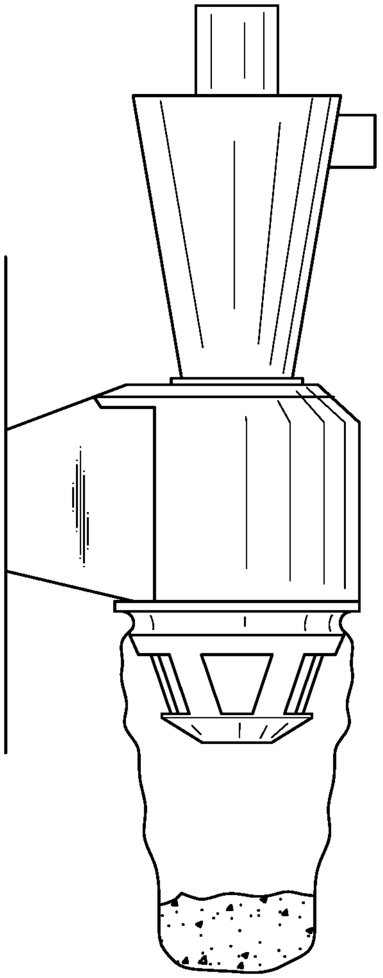
FIG. 20 is a side elevation of a rotational molded embodiment, with wall bracket.
Figure 21:
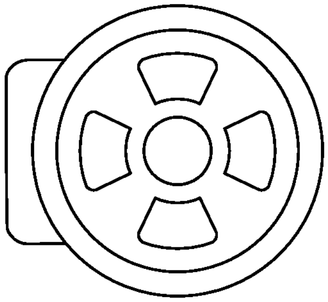
FIGS. 21, 22, and 23 are a bottom view, vertical sectional view, and back view of the dust separator and bagger of this embodiment.
Figure 22:
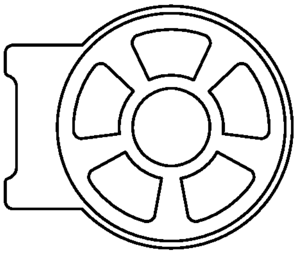
Figure 23:
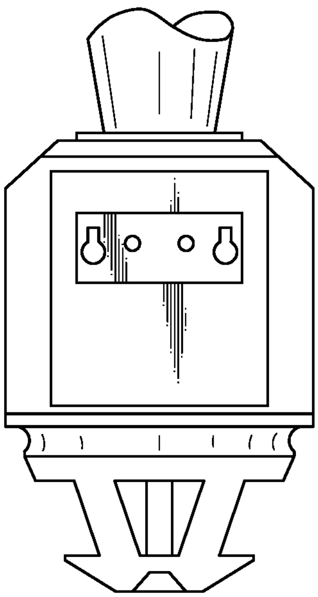

FIG. 20 illustrates a rotational-molded unit, which is generally similar to the dust collection system of the previous embodiments. This is designed to be rotationally molded, and can be easily mounted to any vertical surface, or to the side of a barrel-shaped device such as a shop vacuum, or can be mounted on a tripod or wheeled frame. With a bracket angle adapter as described earlier this unit may also be mounted on a non-vertical surface or support member.

While several embodiments have been shown and discussed hereinabove, many variations and re-configurations are possible without departing from the main principles of this invention. The units may be made of a wide variety of materials as need be for different purposes.

What is claimed is:

1. A negative-pressure dust extractor, in which a cyclonic dust separator device receives a stream of dust-laden air through an intake into a conic separator body, which separates the dust that is entrained in the stream of dust-laden air, exhausts the air stream through an outlet vortex tube to a vacuum-inducing machine, and discharges the separated dust downward through a dust outlet at a nose of the conic separator body; and wherein a bagger arrangement is mounted in communication with said dust outlet and includes: an open-bottom generally rigid container disposed below the nose of the conic separator, and having a top plate with a central dust inlet opening, a side wall descending from top plate, and an open bottom, wherein the nose of the conic body is coupled to said central dust inlet opening in said top plate, and in which a grid extends across the open bottom of the container, defining a dust collection space within said rigid container between said top plate and said grid; and a flexible dust collection bag hangs from said container and has an upper end removably clamped onto an exterior of said container, and a closed bottom spaced beneath said open bottom of said container; the grid being configured to have spaced-apart bars therein dimensioned and configured so that dust in the container passes freely through the grid barrier when said vacuum-inducing machine is shut off; and so that said bag may be sucked up against said bars, but not sucked up into said open-bottom container, when said vacuum-inducing machine is operating.

2. The negative-pressure dust extractor according to claim 1, wherein said open-bottom container comprises a generally cylindrical body disposed below said cyclonic dust separator.

3. The negative-pressure dust extractor according to claim 2 further comprising an adjustable mounting bracket having a portion fastened onto said generally cylindrical body, and which includes a second, adjustable portion for mounting on a separate surface that is vertical to sloping from vertical.

4. The negative-pressure dust extractor according to claim 1, wherein said bars are configured as a grillwork of rigid bars or wires.

5. The negative-pressure dust extractor according to claim 1, wherein said flexible dust collection bag includes a tubular series of bags accordion-folded and fitted to the exterior of said open-bottom container.

6. The negative-pressure dust extractor according to claim 1, wherein said bag is formed of a film of about 3 mil or 4 mil thickness.

7. The negative-pressure dust extractor according to claim 1 wherein said open-bottom container and said grid are unitarily formed as a molded unit.

8. A negative-pressure dust extractor, in which a cyclonic dust separator device receives a stream of dust-laden air through an intake into a separator body, separates the dust that is entrained in the stream of dust-laden air, exhausts the air stream through an outlet tube to a vacuum-inducing machine, and discharges the separated dust downward through a dust outlet at a lower end of the conic separator body; and wherein a bagger arrangement is mounted in communication with said dust outlet and includes: an open-bottom generally rigid container disposed below the lower end of the separator body, in which a top plate has a central dust receptacle opening attached with the dust outlet of said conic separator body; a generally cylindrical wall descends from said top plate to said open bottom, in which a flexible apron extends around the open bottom of the generally rigid container such that a dust collection space is provided between said top plate and said flexible apron, and a flexible dust collection bag hangs from said container and has an upper end removably clamped onto an exterior of said container, and a closed bottom spaced beneath said open bottom of said container; the apron being configured so that dust in the container passes freely through the apron when said vacuum-inducing machine is shut off; and so that said bag may be sucked up against said barrier, but not sucked up into said open-bottom container, when said vacuum-inducing machine is operating, the apron being attached onto a lower portion of said open-bottom container and extending downward within said flexible dust-collection bag.

9. The negative-pressure dust extractor according to claim 8, wherein said flexible apron extends circumferentially around said open-bottom container and extends beneath said open-bottom container.

10. The negative-pressure dust extractor according to claim 9, wherein said flexible apron comprises a series of individual flaps.

* * * * *